Feb. 13, 1934.     R. C. HOFFMAN     1,947,045
POWER PLANT
Filed Oct. 9, 1931     6 Sheets-Sheet 1
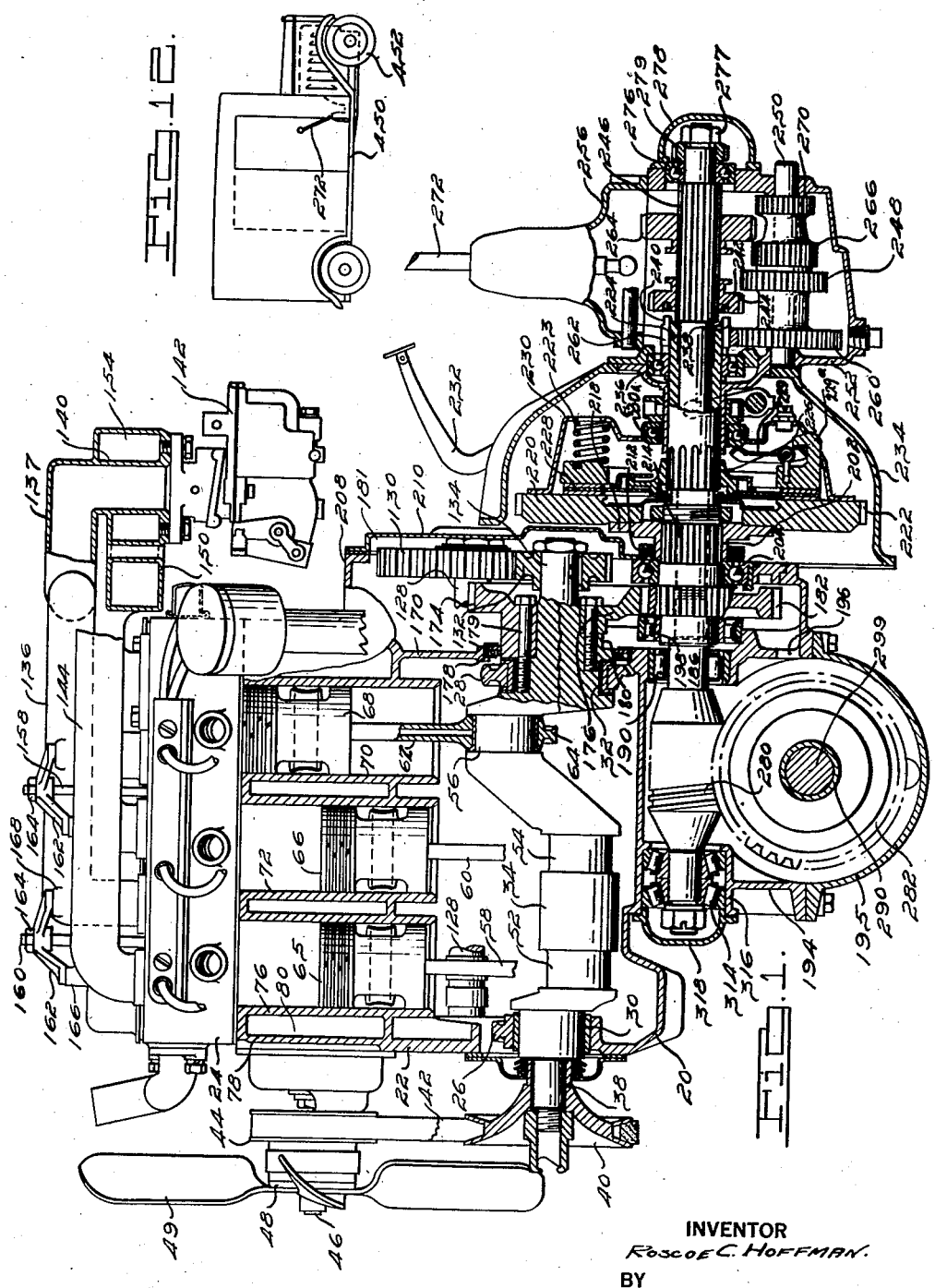
INVENTOR
Roscoe C. Hoffman.
BY
Harness Dickey Pierce & Hann
ATTORNEYS.

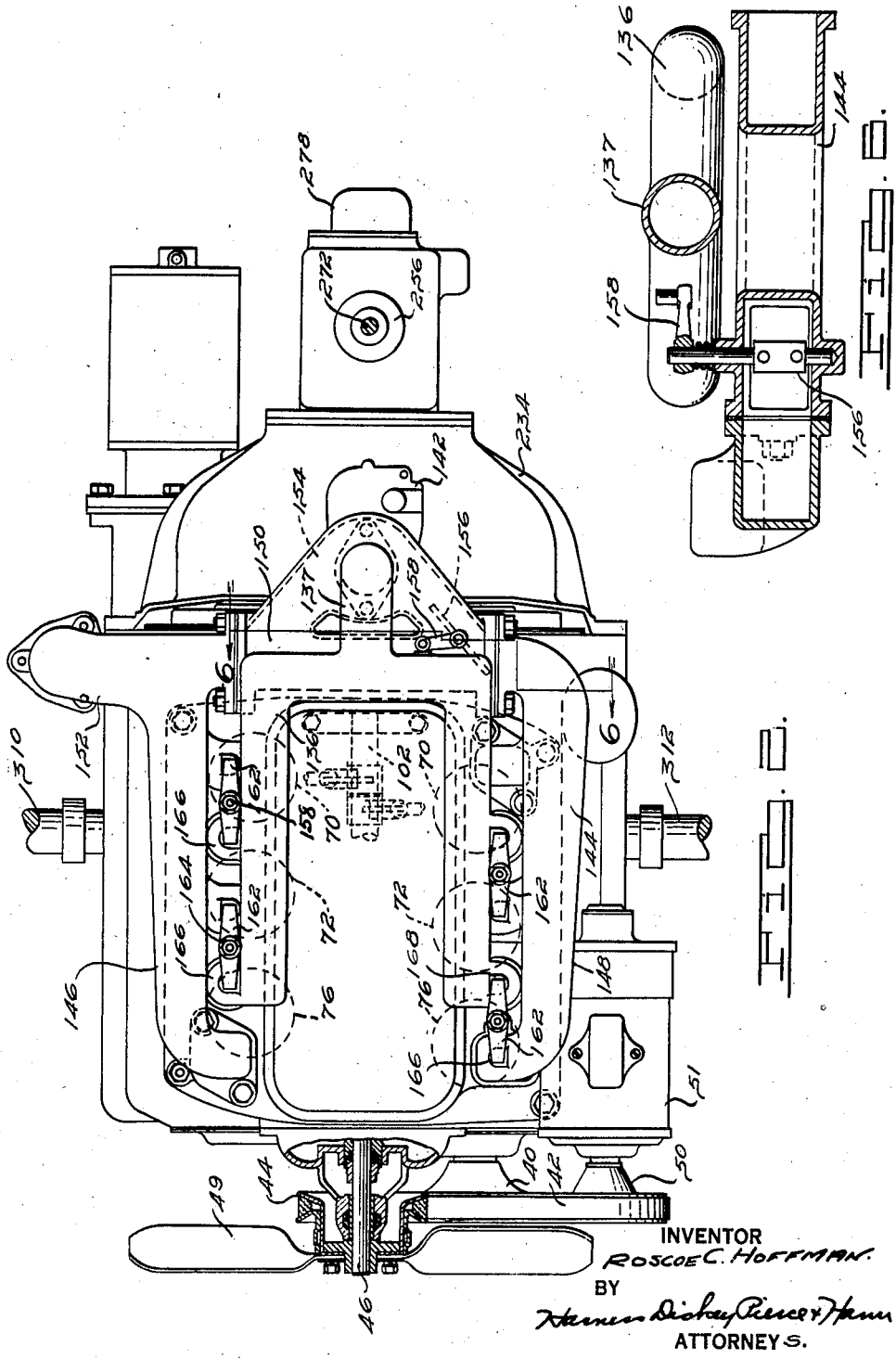

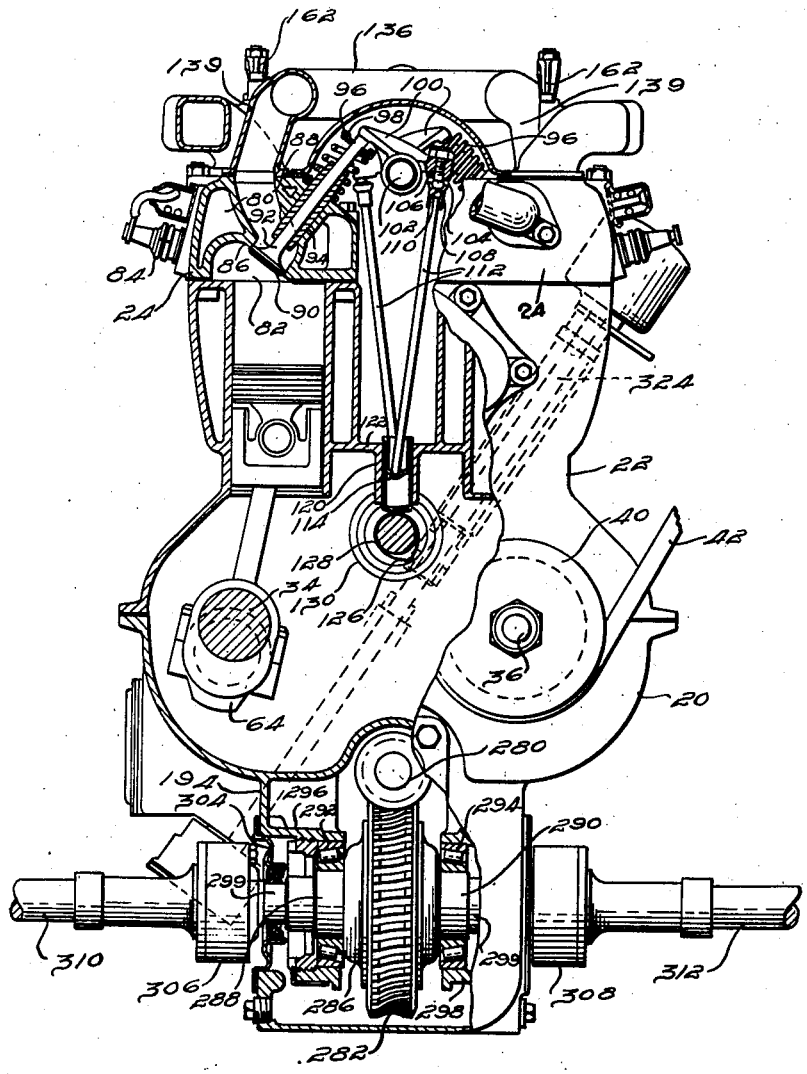

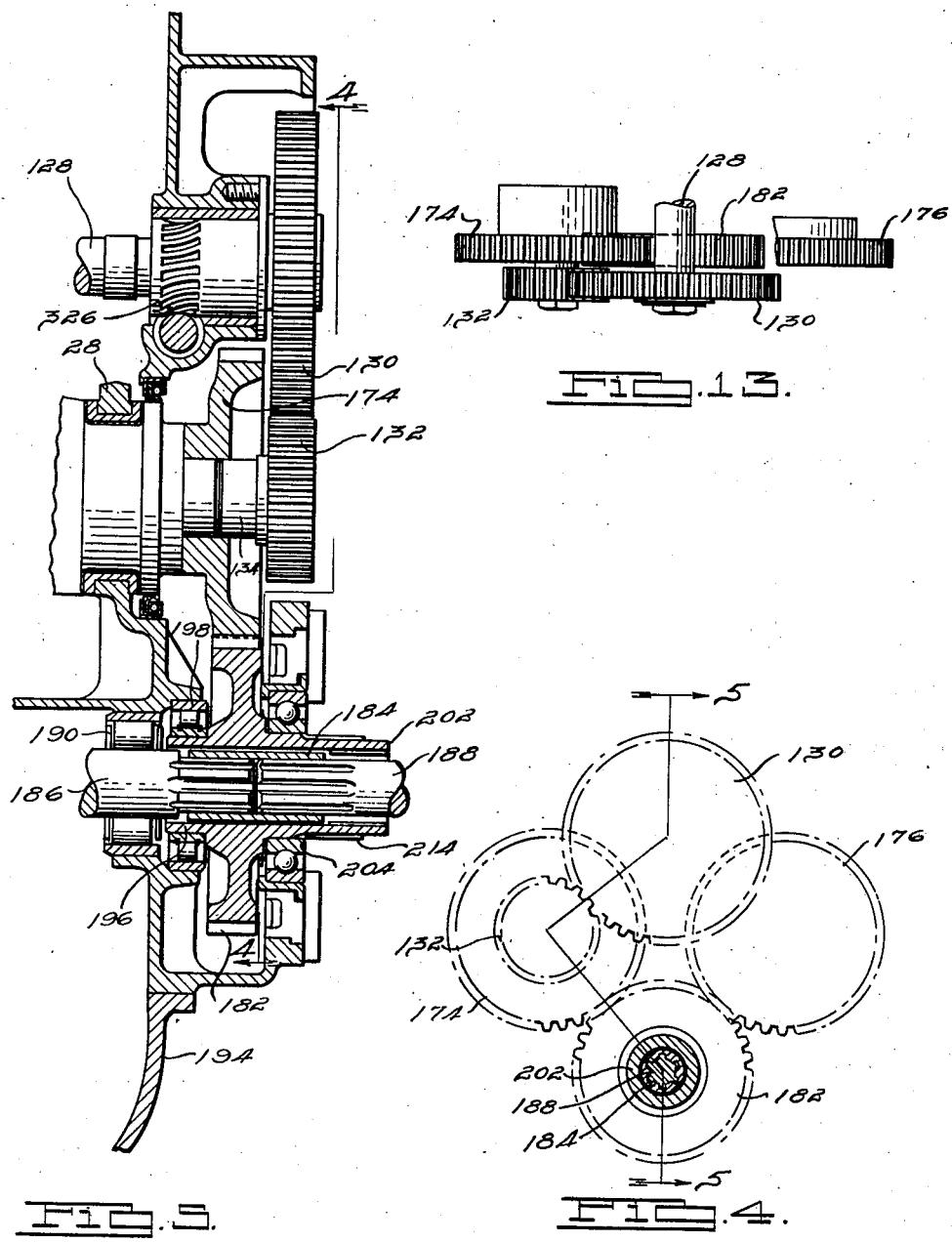

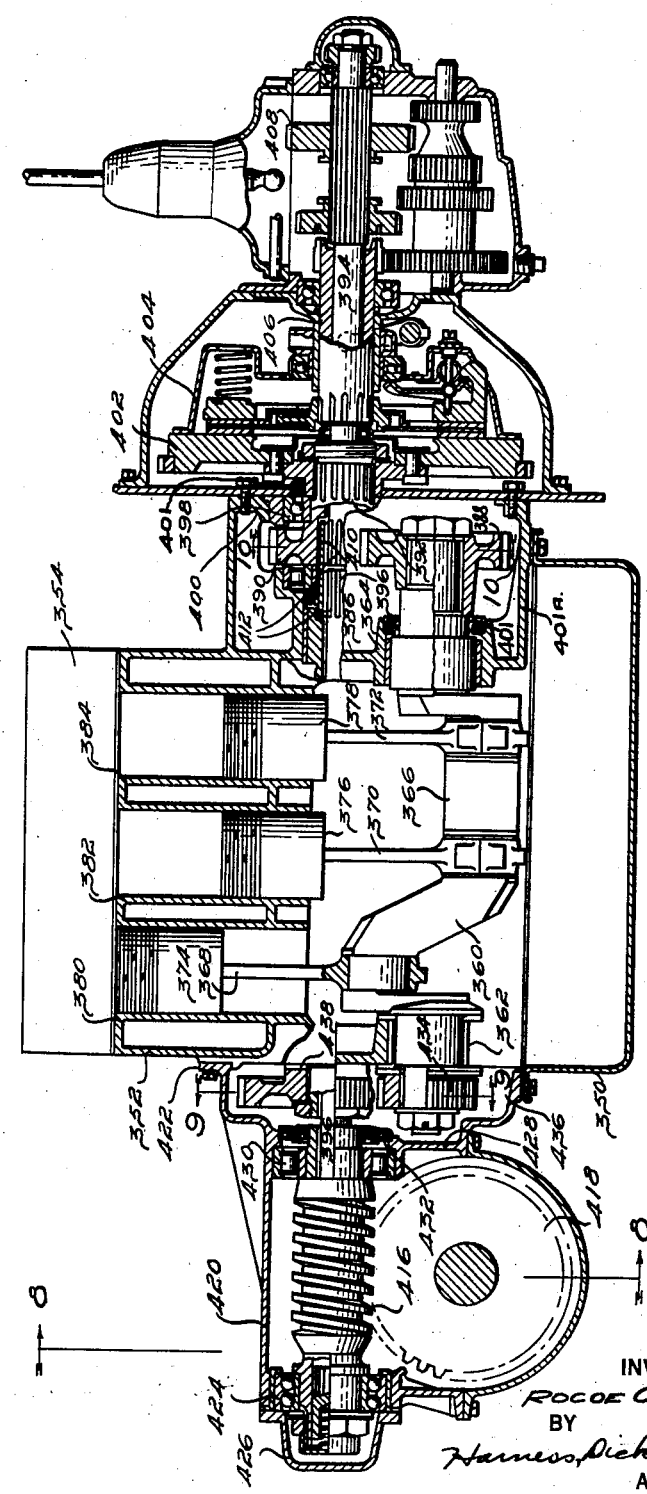

Feb. 13, 1934.     R. C. HOFFMAN     1,947,045
POWER PLANT
Filed Oct. 9, 1931     6 Sheets-Sheet 6
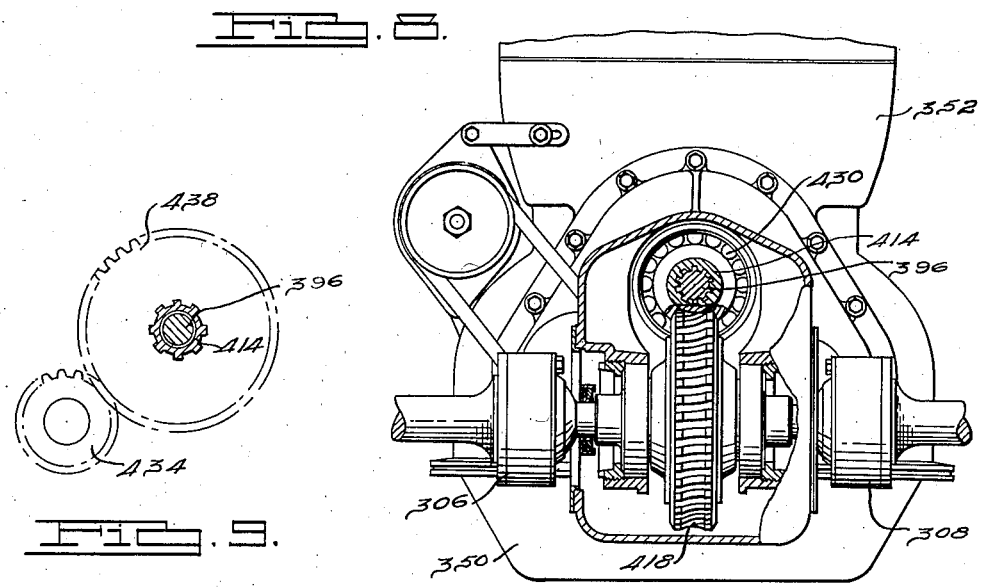
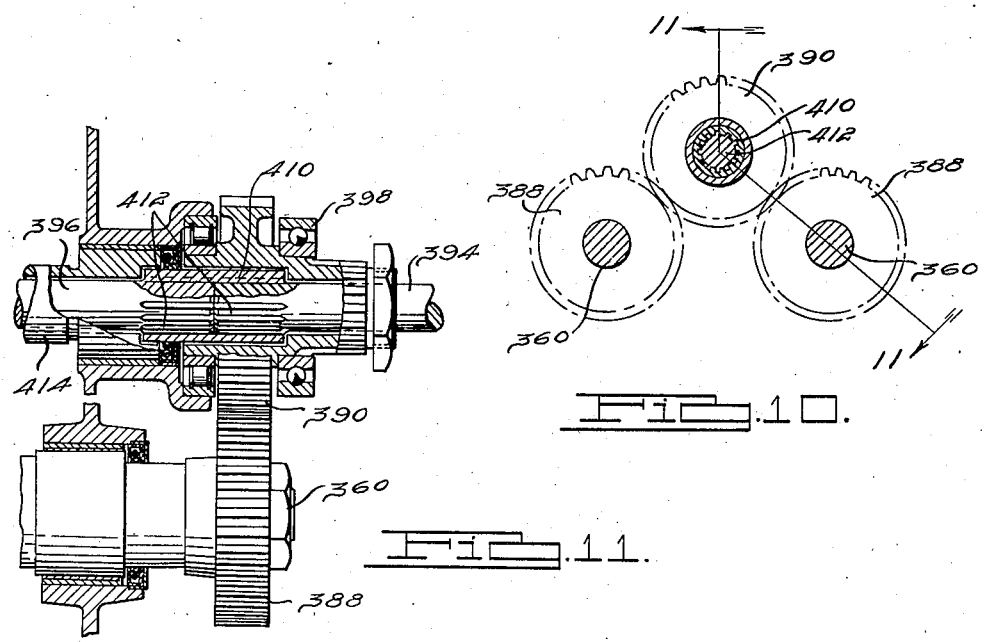
INVENTOR
ROSCOE C. HOFFMAN.
BY
ATTORNEYS Patented Feb. 13, 1934

1,947,045

UNITED STATES PATENT OFFICE 1,947,045

POWER PLANT

Roscoe C. Hoffman, Detroit, Mich.

Application October 9, 1931. Serial No. 567,783

18 Claims. (Cl. 123—55)

This invention relates to power plants of the internal combustion type and has for its principal objects the provision of a simple, compact power plant unit particularly adapted for use in connection with motor vehicles, motor boats and the like.

Other objects of the invention are to provide an internal combustion power plant unit of minimum longitudinal dimensions; a power plant unit in which a plurality of spaced parallel crank shafts are connected together for equal rotation, each crank shaft being associated with a separate row of cylinders; and to provide a novel means for taking off the power from both of the crank shafts and delivering it through suitable gearings to a desired point.

Other objects are to provide an internal combustion engine in combination with a novel transmission arrangement therefor; a power plant unit in which a clutch and transmission are arranged at one end of the engine and the power taken off therefrom from a point on the engine side of the transmission; in which a final drive unit on the engine side of the transmission is unitarily associated with the engine and is operatively connected to the transmission; in which such final drive unit is secured to the under side of the engine, or to that end thereof opposite the transmission mechanism; in which such final drive unit includes a differential mechanism for differentially driving the wheels of a motor vehicle.

Other objects are to provide a new and novel manifold construction for internal combustion engines.

Another object is to provide a motor vehicle having a novel arrangement of power plant therein.

Further objects of the present invention are to provide an internal combustion engine power plant unit including an engine, a transmission unit at one end of the engine and a final drive unit at the opposite end thereof, the transmission unit and the final drive units being connected by a shaft extending through the engine between the top and bottom limits thereof; a power plant of the type above described in which the shaft connecting the transmission and final drive unit passes through a cam shaft of the engine.

For a better understanding of the invention reference may now be had to the accompanying drawings, illustrating suitable embodiments of the invention and in which:

Figure 1 is a partly broken, partly vertical section side elevation of one form of the invention.

Figure 2 is a partly broken plan view of the invention disclosed in Fig. 1.

Fig. 3 is a partially broken, partially vertically sectioned front elevational view of the invention shown in the previous figures.

Fig. 4 is a front elevational view, taken in the direction of line 4—4 of Fig. 5, more-or-less diagrammatically illustrating the arrangement of the gears upon the rear end of the dual crank shaft of the engine shown in the previous figures together with certain gears intermeshing therewith.

Fig. 5 is a fragmentary vertical sectional view taken substantially on the line 5—5 of Fig. 4.

Fig. 6 is a fragmentary cross sectional view taken substantially on the line 6—6 of Fig. 2 and illustrating details of construction of the intake manifold and control of the exhaust heat thereto.

Fig. 7 is a view similar to Fig. 1 but showing a modified form of the invention.

Fig. 8 is a fragmentary cross sectional view taken substantially on the line 8—8 of Fig. 7.

Fig. 9 is a fragmentary cross sectional view taken substantially on the line 9—9 of Fig. 7 and illustrating in a more or less diagrammatical manner the cam shaft drive.

Fig. 10 is a fragmentary cross sectional view taken substantially on the line 10—10 of Fig. 7.

Fig. 11 is a fragmentary sectional view taken substantially on the line 11—11 of Fig. 10.

Fig. 12 is an elevational side view of a vehicle in which my improved power plant is shown incorporated.

Fig. 13 is a fragmentary top plan view of the crank shaft gearing of the form of the invention disclosed in Figs. 1 to 6 inclusive.

In the conventional type of automobile power plant the engine embodies a plurality of cylinders which are arranged either in a straight line with respect to each other or a pair of such lines arranged in V relation. In either of these types the various pistons in the cylinders are connected for operation with a single crank shaft. In either of such constructions the clutch, transmission and final drive mechanism have conventionally been arranged at one end of the engine, and this whether the power plant is for a rear wheel drive or a front wheel drive vehicle.

The arrangement of parts in the conventional power plant, as above described, when such power plant is applied to a motor vehicle, consumes a relatively large proportion of the total length of the vehicle, thus reducing the amount of available body space for a given wheel base. Furthermore, due to the fact that the engine is usually positioned at the opposite end of the vehicle from the final drive unit, a relatively long propeller shaft must be employed to connect the final drive unit to the power plant unit, and this propeller shaft must necessarily be maintained at a predetermined distance above the ground to provide necessary ground clearance, and, as a result, the interior arrangement of the vehicle must be such as to permit the maintenance of such clearance. By the use of the present invention the disadvantages in conventional constructions as above pointed out are materially reduced, that is, the length of the power plant unit is considerably shortened so as to increase the available body room in the vehicle, and the propeller shaft extending between opposite ends of the vehicle is entirely eliminated thereby permitting any interior arrangement of the vehicle body without regard to such part.

An engine constructed in accordance with the form of the present invention is disclosed in Figs. 1 to 6 inclusive and Fig. 13 embodies a crank case lower half 20, a combined dual cylinder block and upper crank case half 22, and a pair of cylinder heads 24. Main bearings 26 and 28 best shown in Fig. 1 are disposed adjacent the end of the motor and are secured to the crank case lower half 20 and are removable from the engine as a unit therewith. These bearings rotatably receive the end portions 30 and 32 of a pair of spaced parallel crank shafts 34 and 36, best shown in Figs. 1 and 3. A forwardly projecting portion 38 of the crank shaft 34 is provided with a grooved pulley 40 about which passes a belt 42 of conventional design. The belt 42 also passes over a second pulley 44 which is mounted on the shaft 46 journaled in the bearing 48 on the forward wall of the cylinder block, and the forward end of the shaft 46 is provided with a conventional fan 49 designed to draw air through a conventional radiator (not shown) positioned in advance of the engine in the usual manner. In the embodiment shown in the drawings the belt 42 also passes about the pulley 50 which drives the generator 51, mounted on the side of the engine in a conventional manner.

The construction and operation of the crank shafts 34 and 36 to provide the desired conditions of engine balance are not described herein as the subpject matter thereof will be described and claimed in a separate patent application specifically directed thereto.

As best shown in Fig. 1, the crank shafts are formed with throws 52, 54 and 56 upon which the lower extremities of connecting rods 58, 60 and 62 are journaled by means of bearings 64. The upper extremities of the rods are pivoted in conventional manner to pistons 65, 66 and 68 which reciprocate in cylinders 70, 72 and 76.

These cylinders are formed preferably vertically in two lines in the cylinder block and, as best shown in Fig. 2 in dotted lines, the cylinders in one line are arranged in staggered relation with respect to the cylinders in the other line. The cylinders are also enclosed in a conventional jacket 78 providing a water chamber 80 hereabout.

Each of the cylinder heads 24 as shown in Fig. 3 is provided with passages 80 in communication with the cylinder water jackets in a conventional manner. The heads may also be formed with combustion chambers 82 which preferably are of the high compression type. Spark plugs 84 extend into the combustion chambers in the usual manner and provide means for igniting charges contained therein. Ports 86 leading to passages 88 for the ingress of fuel mixture and similar ports for the egress of exhaust gases are formed in the cylinder head and are provided with diagonally disposed poppet valves such as 90 of ordinary construction. These valves have stems 92 extending through guides 94 formed in the engine head and the upper extremities of the stems are encircled by coil springs 96 which at their lower ends engage the upper face of the engine head and at their upper ends engage collars 98 upon the valve stems for purposes of urging the valves into engagement with the seating portions of the ports 86.

The valves are actuated by means of rocker arms 100 engaging the upper extremities of the valve stems 92 and rocking upon a shaft 102 disposed longitudinally of the engine between the heads thereof as best shown in Fig. 2. The arms are provided with brackets 104 having pins 106 extending therethrough, and these pins at their lower extremities are provided with ball like heads 108 disposed within a socket bearing 110 upon the upper extremities of actuating rods 112. The rods at their lower extremities are rounded and the rounded portions are disposed within cup-like tappets 114. The tappets 114 reciprocate within suitable tappet guides 120 projecting downwardly from a web 122 extending between the rows of cylinders in the cylinder block. The lower extremities of the tappets bears upon a conventional valve operating cams 126 upon a cam shaft 128 extending longitudinally of the engine in a plane intermediate of the rows of cylinders.

The cam shaft is actuated by a gear 130 mounted upon the rear extremity thereof that engages a mating gear 132 keyed upon the rearwardly projecting portion 134 of the crank shaft 34. Obviously, the operation of the cam shaft for actuating the rods 112 which in turn rock the valve actuating arms 100 is conventional.

The inlet manifold shown for supplying the inlet passages 88 with combustible mixture comprises a main portion 136 of U-shape in plan view, the legs of which extend over the top of the cylinder head for the respective groups of cylinders and are connected to the inlet passages 88 of the respective cylinders by short downwardly extending branches 139. A short duct 137 connected to the bottom of the U midway between the legs thereof extends to the right, as viewed in Figs. 1 and 2, where it connects with the vertically extending riser 140, to the lower end of which is secured a conventional carburetor 142.

This arrangement insures an equal distribution of the fuel to the various inlet ports of the engine and places the carburetor in an easily accessible position and where it will not interfere with access to the valve tappet clearance adjustment screws 106, previously described.

As also best indicated in Figs. 1 and 2, the exhaust manifold 144 is of generally U shape and the legs 146 and 148 thereof are disposed over and parallel to the respective cylinder groups. The exhaust gases from the manifold 144 are discharged therefrom through a branch 152 which projects downwardly over the side of the engine from the junction of the bottom 150 of the U and the leg 146 thereof. A bypass 154 is provided around the major portion of the length of the bottom 150 of the U exhaust manifold and this bypass encircles the riser 140 of the intake manifold. A butterfly type of valve 156, best shown in Fig. 2, is disposed within the exhaust manifold at the junction of the bypass 154 and that end of the bottom 150 of the U nearest the leg 148 of the exhaust manifold. A lever 158 connected to the valve shaft is provided for controlling the position of the valve 156, and enables the valve 156 to be moved so as either to prevent the flow of exhaust gases from the leg 148 through the bypass, or to such position as to insure substantially all of the gases from the leg 148 passing through the bypass 154 to effect a heating of a combustible mixture flowing through the riser 140.

The intake and exhaust manifolds are as shown clamped upon the cylinder heads by means of stud bolts 158 threaded into the upper surface of the heads and having screw threaded extremities 160 upon which clamping arms 162 are located and adapted to be drawn downwardly by means of nuts 164 threaded on the studs. The opposite extremities of the arms rest upon the upper faces of lugs 166 and 168 formed on the inlet and exhaust manifold respectively so as to urge the manifolds downwardly into clamping relation with respect to the cylinder heads.

As indicated in Figs. 1, 4, 5 and 13, the right hand end of the shafts 34 and 36 project through the rear wall 170 of the crank case when they are provided with sealing rings 178. A rearwardly extending wall 208 on the crank case, and cooperating cover member 210, forms a chamber 181 at the right hand end of the engine into which the shafts 34 and 36 project. Within this chamber the crank-shafts 34 and 36 are provided with gears 174 and 176 respectively arranged in a common plane. These gears are secured to their respective crank shafts by bolts such as 179. Both of these gears in turn, as best illustrated in Fig. 4, mesh with a single gear 182 which, as best illustrated in Fig. 5, is provided on opposite sides with hub-like extensions 196 and 202 respectively received in bearings 198 and 204 which serve to rotatably support it against axial displacement in the crankcase lower half 20. Thus both crank shafts are connected together for equal rotation through the intermediary of the gears 174, 176 and 182, and I employ the gear 182 for the purpose of transmitting the power generated by the engine through the desired paths of travel. Consequently the rearwardly extending hub extension 202 is splined as at 214 and suitably fixed against movement thereon is a flange member 218 which supports and to which is secured a flywheel 220 which may be of conventional construction. A sealing ring 212 secured to the cover member 210 encircles the hub of the flange member 218 and serves to prevent escape of lubricant around the hub from the chamber 181. The flywheel 220 may be provided with the usual ring gear 222 for co-operation with an electric starting motor in the conventional manner.

The flywheel 220 is employed as part of a clutch in accordance with conventional practice. While the clutch may be of any conventional construction, modified as hereinafter explained to permit the independently rotatable central shaft to extend through it, the particular clutch shown by way of illustration includes a clutch driven disc 228 secured to a hub flange 226 splined to the forward end of the tubular shaft 224, a pressure ring 229a urged by springs 223 towards the flywheel 220 to normally clamp the disc 228 between it and the flywheel, and a sheet metal housing 230 inclosing the operative parts of the clutch and serving as an abutment for one end of the springs 223. Throw-out arms 229 of conventional construction are provided for cooperation with a throw-out bearing 330a controlled by the usual clutch pedal 332 for permitting the clutch to be disengaged upon depression of the pedal 332 in accordance with conventional practice.

The clutch is enclosed in a conventional clutch housing 234 secured to the rear end of the engine by suitable means (not shown) and in turn supports at its rear end a transmission housing 252 provided with the usual cover 256. A suitable bearing 236 is clamped between the clutch housing 234 and the transmission housing 252 for the purpose of rotatably receiving and supporting the tubular shaft 224.

The main transmission shaft 246 is supported at its rear end in bearing 276 carried by the rear wall of the transmission housing 252 and its forward end is reduced so as to be rotatably received within the tubular shaft 224 which it aids in supporting. Longitudinal movement of the transmission shaft 246 is prevented by means of the nut 277 threaded on the rear end thereof and which serves to clamp the speedometer drive gear 279 and the bearing 276 against relative axial movement with respect thereto. The bearing 276 is itself maintained against axial movement by the cap 278 suitably secured to the rear end of the transmission casing 252 and serving to seal the opening in the transmission housing which receives the bearing 276.

Rotatably supported below and in parallel relation with respect to the shaft 246 is the counter shaft 250 and rotatably received thereon is a gear cluster of conventional construction including the constant mesh gear 260, second speed gear 248, low speed gear 266 and the reverse gear 270. The usual sliding gears 244 and 264 are provided on the main transmission shaft 246 for cooperation with the gears 248 and 266 and 270 respectively, it being understood that a suitable reverse idler gear, not shown, is provided for cooperation between the gears 264 and 270, all of which is in accordance with conventional practice. The remaining constant mesh gear 262 is formed on the rear end of the tubular shaft 224 and meshes with the gear 260 in the conventional manner. The rear end of the gear 262 is provided with dental clutch teeth 240 adapted for engagement with cooperating teeth 242 formed in the forward face of the gear 244 for effecting a direct drive in accordance with conventional practice. It will be understood that the usual apparatus for selectively shifting the gears 244 and 264 is carried by the transmission housing cover 256 and in turn is selectively controlled through movements of the usual shifting lever 272, this being in accordance with conventional practice and accordingly is not shown in detail.

From the description of the transmission mechanism so far described it will be apparent that the driving effort from the crankshafts 34 and 36 is transmitted through the gears 174 and 176 respectively to the gear 182 and thus transmitted to the flywheel 220. The driving effort is transmitted from the flywheel 220 through the clutch disc 228 and hub 226 to the tubular shaft 224 into the forward end of the transmission. Within the transmission the power from the shaft 224 may, by selectively shifting the gears 244 and 264, be passed through the desired gear train to the main transmission shaft 246 and then forwardly back through the hollow shaft 224 and the clutch to within the gear 182.

As best indicated in Fig. 5 the forward end 188 of the main transmission shaft 246 is splined and is received within the splined interior of the sleeve 250

184 rotatably received within the gear 182. The splined rear end of a forwardly projecting shaft 186 is also received within the splined interior of the sleeve 184 and this shaft extends into the interior of a housing 194 suitably formed on the under side of the crank case lower half 20 as indicated in Fig. 1, this housing being provided with a suitable bottom cover 195 as indicated. The interior of the housing 194 is completely sealed against possibility of leakage of lubricant between it and the interior of the crank case of the engine, but is open to the free passage of lubricant between it and the chamber 181 housing the gears 174, 176 and 182 in order that a common supply of lubricant of suitable character may be provided for both chambers.

The shaft 186 where it projects through the rear wall of the housing 194 is provided with a suitable roller bearing 190. The forward end of the shaft 186 is supported and maintained against relative axial movement at the forward end of the housing 194 by a pair of tapered roller bearings 314 arranged in back to back relationship and suitably secured within the tubular casing part 316 formed integrally with the front wall of the housing 194 for this purpose. The open end of the casing 316 is sealed against leakage by means of a cap 318.

A worm 280 is fixed to the shaft 186 centrally of the housing 194. As best indicated in Fig. 3 the worm 280 lies in mesh with a worm gear 282 secured to a differential carrier 286 of conventional construction. As in conventional constructions the differential carrier 286 is provided on opposite sides with trunnions 288 and 290 rotatably received within bearings 292 and 294 respectively carried by the bearing carriers 296 and 298 projecting inwardly of the housing 194 from opposite sides thereof. Stub shafts 299 connected with a mechanism interiorly of the differential carrier 286 in the usual manner project from opposite sides thereof to a position beyond the corresponding side walls of the housing 194 where they are connected to the universal joints 306 and 308 respectively. The universal joints 306 and 308 are, in turn, secured to axle shafts 310 and 312 respectively which extend outwardly from the center of the vehicle and are connected to suitable driving wheels. The outer ends of the bearing carriers 296 and 298 are sealed by a closure plate 304 suitably engaging the shafts 299 in order to prevent leakage of lubricant from the housing 194 around the shaft 299.

From the foregoing description it will be understood that the power from the engine which is transmitted to the main transmission shaft 246 in suitably geared down relation in accordance with the explanation heretofore given, is transmitted by the forwardly extending reduced portion 188 thereof through the clutch and to a point within the gear 182 where it is transmitted through the sleeve 184 to the shaft 186 and then to the worm 280. The worm 280 in rotating causes rotation of the worm wheel 282 which, being fixed to the differential mechanism 286, transmits it to the axle shafts 310 and 312 from which it passes to the driving wheels of the vehicle in order to cause movement of the same.

It will thus be apparent that although the clutch transmission for the engine are so mounted as to make it possible to control the same in the conventional manner, the drive is taken off from a point forwardly of the transmission. This arrangement permits a construction such as is illustrated in Fig. 1 wherein the entire driving mechanism of the vehicle may be so arranged as not to exceed the combined length of the engine, clutch and transmission, the final drive unit being contained within the length of these parts. This arrangement, particularly in combination with a plural crankshaft engine construction as illustrated, results in a power plant unit of minimum length for the power delivered. The resulting construction adapts itself ideally to certain types of motor vehicles, and while the above description has been given under the assumption that the construction is provided for a front wheel drive mechanism it will be obvious that it may be reversed and employed at the rear of the vehicle to provide a so called rear engine drive.

It may be noted that although the chamber 181 is sealed against transfer of lubricant between it and the interior of the engine crank case, it has provisions for free communication with the interior of the casing 194 through the opening 196 in the wall common to both. Consequently the lubricant in both these chambers may freely intermix, which is desirable in that a single grade of lubricant suitable for use in connection with the gear means housed therein, and which is not suitable for use in the crank case, may be employed and a single supply only for both is necessary.

The unit is particularly adaptable to those types of vehicles commonly known as delivery types and particularly to that class thereof employed for the distribution of milk from door-to-door. This latter use is more-or-less diagrammatically indicated in Fig. 12 wherein a milk wagon is indicated generally as 450 and in which the power plant above described is incorporated for the purpose of driving the front wheels 452 thereof. The present construction in such case concentrates all the driving mechanism for the vehicle at the front end thereof, allowing the floor of the vehicle upon which the articles are to be carried to be positioned at a minimum height from a point immediately back of the transmission to the extreme rear end of the vehicle. Consequently the floor of the vehicle rearwardly of the transmission is entirely clear, providing a non-obstructed passageway from one side of the vehicle to the other through the usual door, and eliminating the necessity of any great lift in placing articles on or removing them from the floor of the body from the rear end thereof.

In the modified form of the invention as disclosed in Figs. 7 to 11 inclusive the power from the engine, instead of being transmitted forwardly through a line of shafting disposed below the crank shaft, is transmitted through the engine above the crank shaft by means of a shaft disposed concentrically within a tubular cam shaft which actuates the valves of the engine. The construction includes a crank case 350, a cylinder block 352 and engine heads 354. These elements all substantially correspond to the construction as previously described in connection with the form of the invention just discussed, and for that reason detailed description is reserved. Spaced crank shafts 360 identical in design with the crank shafts 34 and 36 are journaled in parallelism with respect to each other in bearings 362 and 364 formed in the ends of the cylinder block 352 in conventional manner. These crank shafts include throw portions 366 also of conventional design upon which the lower extremities of conventional connecting rods 368, 370 and 372 are journaled. The upper extremities of these rods are pivoted within conventional pistons 374, 376 and 378, which reciprocate within corresponding cylinders 380, 382 and 384. It is to be understood that these cylinders are provided with suitable inlet and outlet valves leading to suitable inlet and outlet manifolds and also with a suitable ignition system. Since all of these constructions are convention or at least in accordance with the description heretofore given, description thereof is not deemed necessary.

The rear extremity of the crank shafts 360 project through the rear wall 386 of the crank case upper half and have gears 388 positively keyed thereupon. These gears mate with a corresponding gear 390 integral with a rearwardly extending sleeve 392 which is concentrically disposed with respect to a forwardly extending portion 394 of a power transmitting shaft 396. A sleeve 392 is journaled in a ball bearing 398 disposed in the forward wall 400 of the crank case, a gear housing 401a, the bearings about the rear extremities of the crank shafts 360 and the bearing 398 are sealed by members 401 that prevent leakage of oil between the crank case and the casing 401a for the gears 388 and 390. The sleeve is also rigidly secured to a fly wheel 402 identical in structure with the fly wheel 222 disclosed in Fig. 1. The fly wheel is, likewise, associated with a clutch mechanism indicated generally by the numeral 404 which is identical with the corresponding clutch mechanism disclosed in Fig. 1 previously described. In view of the identity of the structures it is not deemed necessary to describe the latter clutch mechanism in detail.

A sleeve 406 identical with the sleeve 224 as disclosed in Fig. 1 transmits power to a transmission mechanism indicated generally by the numeral 408. This mechanism is also identical with the mechanism as disclosed in connection with the previously described embodiment of the applicant's invention and, accordingly, will not be described in detail.

Power is transmitted through the sleeve 406 through the transmission mechanism 408 to the shaft 394 and from the latter is transferred forwardly through the sleeves 406 and 392 to a sleeve 410 which rotates within the gear 390 and which provides a positive connection between splined end portions 412 of shafts 394 and 396. The shaft 396, rotating concentrically within a tubular cam shaft 414, transmits power to a worm gear 416 corresponding to the worm 280. The worm in turn drives a transmission mechanism indicated generally by the numeral 418. This differential mechanism is identical in construction with the mechanism as disclosed in connection with the previously described embodiment of the invention and, since it is conventional in nature, description thereof is reserved.

The differential mechanism 418 preferably is housed in a housing 420 provided with flanges 422 which are bolted to the forward end of the engine cylinder block and crank case. At its forward end the housing 420 is provided with bearing 424 within which the forward end of the shaft 396 is adapted to be supported and to rotate. The opening in the housing 420 which receives the bearing 424 is preferably closed by means of a cap-like member 426 secured to the forward wall thereof. The rear wall 428 of the housing 420 is provided with a second bearing 430 within which an intermediate portion of the shaft 396 is adapted to rotate. The escape of lubricant from the housing through the bearing 430 is prevented by means of a conventional sealing ring 432.

As best shown in Figs. 7 and 9, the forward extremity of one of the crank shafts 360 is provided with a gear 434 which rotates in a chamber 436 provided between the forward end of the cylinder block and the rear wall of the housing 420. This gear in turn meshes with a gear 438 which also rotates in the chamber 436 and which is keyed upon the forward extremity of the tubular cam shaft 414, thereby driving the latter in timed relation to the crank shafts for purposes of actuating the engine valves. The operation of this embodiment of the invention is substantially similar to that described in connection with the embodiments as disclosed in Figs. 1 to 6 inclusive, and accordingly needs no further explanation here.

From the foregoing description it will be apparent that I have provided an engine structure embodying a relatively simple system of manifolding whereby the temperature of the incoming fuel mixture may be readily controlled at the will of the operator. Furthermore, I have provided a simple power plant system for motor vehicles embodying an engine, a speed controlling transmission mechanism and a differential mechanism all associated in a single simple unit which may be conveniently attached to a motor vehicle which is compact and in which the various units may be separated from the other units and taken apart for inspection or repairs without disturbing the elements in the other units. The unit, because of its compactness, leaves the vehicle body substantially unobstructed and is highly desirable in commercial types of vehicles.

Formal changes may be made in the specific embodiments of the invention without departing from the spirit and substance of the broad invention, the scope of which is commensurate with the appended claims.

I claim:

1. A power plant including, in combination, a unitary internal combustion having a pair of spaced, parallel crank shafts, a hollow drive shaft operatively connected to both of said crank shafts for receiving driving movement therefrom, a speed change mechanism at one end of said hollow shaft and operatively connected thereto, and a drive mechanism at the other end of said hollow shaft interconnected with said speed change mechanism through said hollow shaft.

2. A power plant including, in combination, a unitary internal combustion having a pair of spaced, parallel crank shafts, a hollow drive shaft operatively connected to both of said crank shafts for receiving driving movement therefrom, a speed change mechanism carried by said engine at one end of said hollow shaft and operatively connected thereto, and a drive mechanism at the other end of said hollow shaft interconnected with said speed change mechanism through said hollow shaft.

3. An internal combustion engine power plant including, in combination, two rows of cylinders, a crank shaft for each row of cylinders operatively connected to pistons therein, a hollow driven member located approximately mid-way between said crank shafts and operatively connected thereto for driving movement therefrom, a clutch and a transmission at one end of said hollow member and operatively connected thereto, a final drive unit at the opposite end of said hollow member, and means extending through said hollow member interconnecting said final drive mechanism and said transmission.

4. An internal combustion engine power plant including, in combination, two rows of cylinders, a crank shaft for each row of cylinders operatively connected to pistons therein, a hollow driven member located approximately mid-way between said crank shafts and operatively connected thereto for driving movement therefrom, a clutch driven by said hollow member and having a hollow driven shaft, a speed change mechanism driven by said hollow shaft and having a driven shaft concentric therewith, a differential mechanism at the opposite end of said hollow member from said speed change mechanism, and means extending through said member, clutch and hollow shaft connecting said differential mechanism with said speed change mechanism driven shaft.

5. An internal combustion engine power plant including, in combination, two rows of cylinders, a crank shaft for each row of cylinders operatively connected to pistons therein, a hollow driven member located approximately mid-way between said crank shafts and operatively connected thereto for driving movement therefrom, a clutch and a transmission carried by said engine at one end of said hollow member and operatively connected thereto, a final drive unit carried by said engine at the opposite end of said hollow member, and means extending through said hollow member interconnecting said final drive mechanism and said transmission.

6. An internal combustion engine power plant including, in combination, an internal combustion engine, a final drive unit secured thereto, clutch and transmission units secured to one end of said engine, hollow means connecting said engine, clutch and transmission for interrelated movement, and means extending through said hollow means for drivingly connecting said transmission to said final drive unit.

7. A power plant comprising, in combination, an internal combustion engine having a chamber within which a crank shaft is adapted to rotate, a housing carried by said engine below the lower wall of said chamber, a final drive mechanism within said housing, a clutch and a transmission unit carried by said engine, means extending between said final drive mechanism and said transmission connecting the two and passing through said clutch, means surrounding the first mentioned means connecting said clutch to said transmission, and a driving connection between said engine and said clutch.

8. An internal combustion engine power plant unit comprising a pair of parallel crank shafts each of the shafts being provided with a gear member interconnected with an intermediate gear member, a tubular shaft projecting from the intermediate gear member and having a clutch element secured thereto, a second tubular shaft disposed in co-axial alignment with the first mentioned shaft and having a clutch element engaging the first mentioned clutch element, a shaft disposed concentrically within the tubular shaft, and speed controlling mechanism interconnecting the free end of the last mentioned tubular shaft and the shaft disposed therewithin.

9. An internal combustion engine power plant unit comprising a pair of parallel crank shafts, each shaft having a gear member carried at an extremity thereof and interconnected with a third gear memer, the intermediate gear member being rotatable upon a shaft and provided with a sleeve portion projecting therefrom and being provided with a clutch element, a second sleeve also rotatable upon the shaft and having a clutch element engaging the first mentioned clutch element, speed ratio controlling mechanism drivingly interconnecting one of the sleeves to the shaft at one end of the shaft, and a differential mechanism connected to the other end of the shaft.

10. A power plant construction for motor vehicles including a pair of parallel crank shafts each of which has a gear member mounted upon an extremity thereof and interconnected with an intermediate gear member, said intermediate gear member being rotatably disposed upon a shaft and having a sleeve portion provided with a clutch element, a second sleeve disposed upon the shaft and being provided with a sleeve engaging the first clutch element, and speed ratio controlling gears interconnecting the latter mentioned sleeve and the shaft, said shaft being provided with a portion extending forwardly in parallelism with respect to the crank shaft in the median plane between the two crank shafts and having a driving connection with a differential mechanism.

11. An internal combustion engine including, in combination, a crank case supporting a plurality of separate rows of cylinders, a crank shaft in said crank case for each of said rows of cylinders, a chamber formed at one end of said engine and sealed against leakage of lubricant between it and said crank case, the ends of said crank shafts projecting into said chamber, and means in said chamber interconnecting said projecting ends of said crank shafts.

12. An internal combustion engine including, in combination, a crank case supporting a plurality of separate rows of cylinders, a crank shaft in said crank case for each of said rows of cylinders, a chamber formed at one end of said engine and sealed against leakage of lubricant between it and said crank case, the ends of said crank shafts projecting into said chamber, means in said chamber interconnecting said projecting ends of said crank shafts, a second chamber formed below said crank case, a differential mechanism within said second chamber, and means interconnecting said crank shafts and said differential mechanism, said chambers co-operating to provide substantially free flow of lubricant between them.

13. An internal combustion engine comprising, in combination, a crank case having a pair of rows of cylinders thereon, a crank shaft in said crank case for each of said rows of cylinders, means interconnecting said crank shafts for equal movement, valves for said cylinders, and a single cam shaft for operating all of said valves.

14. An internal combustion engine comprising, in combination, a crank case having a pair of rows of cylinders thereon, a crank shaft in said crank case for each of said rows of cylinders, means interconnecting said crank shafts for equal movement, valves for said cylinders, and a single cam shaft for operating all of said valves driven from one of said crank shafts only.

15. In an internal combustion engine, in combination, a crank shaft, a hollow cam shaft, a drive shaft rotatable in said cam shaft, and means interconnecting said crank shaft and said drive shaft.

16. An internal combustion engine power plant unit including, in combination, an engine, a crank shaft and a hollow cam shaft for said engine, a drive shaft extending through said cam shaft and rotatable relative thereto, and a speed change mechanism interconnecting said crank shaft and said drive shaft.

17. An internal combustion engine power plant unit including, in combination, an engine, a crank shaft and a hollow cam shaft for said engine, a drive shaft extending through said cam shaft and rotatable relative thereto, a speed change mechanism connecting one end of said crank shaft with the corresponding end of said drive shaft, and a differential mechanism connected to the opposite end of said drive shaft.

18. An internal combustion engine power plant unit including, in combination, an engine, a crank shaft and a hollow cam shaft for said engine, a drive shaft extending through said cam shaft and rotatable relative thereto, a speed change mechanism connecting one end of said crank shaft with the corresponding end of said drive shaft, a differential mechanism connected to the opposite end of said drive shaft, and means at the end of said engine opposite said speed change mechanism interconnecting said cam shaft with said crank shaft.

ROSCOE C. HOFFMAN.